United States Patent [19]
Hewlett et al.

[11] Patent Number: 5,812,303
[45] Date of Patent: Sep. 22, 1998

[54] LIGHT AMPLITUDE MODULATION WITH NEUTRAL DENSITY FILTERS

[75] Inventors: Gregory J. Hewlett, Garland; Vishal Markandey, Dallas; Gregory S. Pettitt, Rowlett, all of Tex.

[73] Assignee: Texas Instruments Incorporated, Dallas, Tex.

[21] Appl. No.: 698,676

[22] Filed: Aug. 15, 1996

[51] Int. Cl.⁶ .................................................. G02B 26/08
[52] U.S. Cl. ............................................ 359/298; 359/561
[58] Field of Search ...................... 359/298, 561

[56] References Cited

U.S. PATENT DOCUMENTS

| | | | |
|---|---|---|---|
| 5,587,786 | 12/1996 | Champagne et al. | 356/121 |
| 5,606,457 | 2/1997 | Chiu et al. | 359/561 |
| 5,608,213 | 3/1997 | Pinkus et al. | 250/252.1 |

*Primary Examiner*—David C. Nelms
*Assistant Examiner*—Reginald A. Ratliff
*Attorney, Agent, or Firm*—Julie L. Reed; James C. Kesterson; Richard L. Donaldson

[57] ABSTRACT

A system and method for increasing the number of bits available for use in a video display system that includes at least one spatial light modulator. The system uses a wheel (30) of three colors, or a color wheel that is clear, including at least one segment (34) which has a lower intensity region, referred to as a neutral density filter. Alternately, the filter could be a liquid crystal controller to control either light amplitude or color. By using a lower intensity region, the amount of time available to process the least significant bit of the data sample is lengthened, thereby eliminating the constraint on the number of bits available for display.

20 Claims, 1 Drawing Sheet

LIGHT AMPLITUDE MODULATION WITH NEUTRAL DENSITY FILTERS

BACKGROUND OF THE INVENTION

1. Field of the Invention

This invention relates to video display systems, more particularly to video display system using spatial light modulators.

2. Background of the Invention

Spatial light modulators used in display systems typically generate an image by controlling a plurality of individual elements, one for each picture element, or pixel, in the final image. These systems have several distinct characteristics that require new approaches to handling the incoming video data. A conventional cathode-ray tube (CRT) system has a non-linear response between the voltage of the signal and the brightness perceived by a viewer. One factor that affects this is the phosphors used on most CRT system screens, which have a non-linear response, but are necessary to generate colors. With spatial light modulators, colors are controlled by the light impinging upon the surface of the device. The light that illuminates the individual elements is already of a certain color, either by use of a white light source and some type of color filters, or by the use of colored light sources, for examples. This eliminates the non-linear response of a conventional CRT system.

The linearity of the spatial light modulator system requires the video data to be "de-gammaed." Because CRT systems are so prevalent, video signals have a correction for the non-linearity of the systems already built into the signal stream, called gamma correction. For a linear system, such as a spatial light modulator system, this correction must be eliminated.

The problem arises in the nature of most spatial light modulation systems. They typically operate by pulse width modulation. The incoming data signal is digitized into samples of a predetermined number of bits for each element. The value for each bit of the sample will depend upon the perceived brightness for that pixel for that frame. The most significant bit (MSB) will be displayed for approximately ½ the color segment time. The color segment time equals the frame time divided by three, so each color, red, green and blue, has ⅓ of the frame time. The frame time is the time associated with each image frame of the incoming signal. For a 60 Hz system, the frame time is 16.67 msecs, which is also referred to as the display refresh rate, because it is the rate at which a standard CRT system rewrites images on the screen.

The eye perceives a full color picture because the operation of the pulse width modulation is too fast for the eye to perceive the changes, and it integrates the brightness and color over the time frame.

The next MSB will have ½ of the ½ color time segment of the MSB, or ¼ of the color segment time, etc, until the LSB is displayed. The LSB width depends upon the smallest interval attainable. For example, if a modulator cannot switch and display its elements in less than 40 μsecs, the LSB time cannot be less than 40 μsecs.

However, in order to fully simulate the response of a CRT operating at the 60 Hz display refresh rate or frame time, the system will require more than 8 bits of data. Spatial light modulators with an LSB time equal to 40 μsecs cannot attain more than 7 bits per color segment. This results in several undesirable artifacts in addition to the poor simulation of a CRT system. In low intensity areas in the image, the smaller number of bits results in contouring artifacts. Additionally, the darker regions appear "dirty" and data compression artifacts are intensified. These problems could be eliminated by using some method of operation the system such that more bits per sample were used.

SUMMARY OF THE INVENTION

A system and method for improved display of video images. The system uses a color wheel or filter with a neutral density filter (NDF) region for each color. The NDF for each color allows the display of bits for longer periods of time, overcoming the limitation of a certain minimum amount of time for display of the lower significance bits.

An advantage of the system is that it allows the use of more bits per sample in display images, producing images with fewer artifacts and images that more closely match those of conventional display systems.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
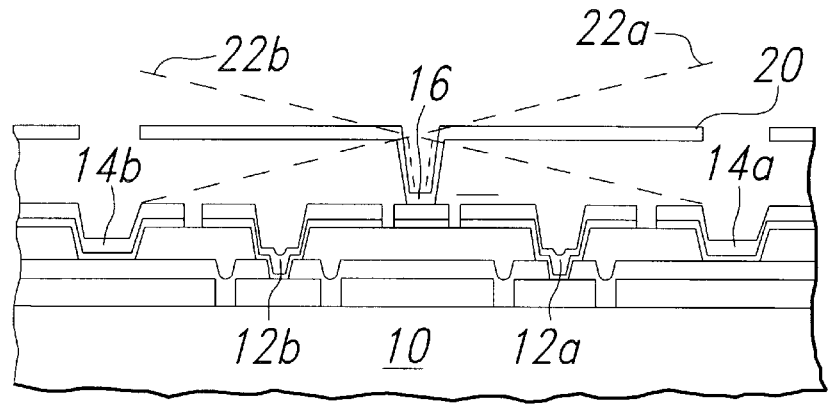
FIG. 1 shows a side view of a spatial light modulator element.

In a conventional pulse width modulation system, the MSB receives ½ of the color segment time. The color segment time is typically ⅓ of the frame time, with ⅓ of each frame time for red, green and blue. For a 60-Hz system, the frame time is ¹⁄₆₀, or 16.67 msec. This 60 Hz rate is also referred to as the display refresh rate, which comes from the rewrite time of CRT systems. This results in a color segment time of 0.01667/3, or a frame time of 5.56 msec, which equals 5560 μsecs.

For a color wheel system, which uses a color wheel with three equal segments of red, green and blue, this time must include the spoke time. The spoke time is the time during which the spokes of the wheel between colors is passing in front of the light source. This time must include the load time for the data onto the addressing circuitry of the modulator, and the response time of the individual elements of the modulator.

Using the 5560 μsecs system as an estimate, it is possible to create a table which shows the times allocated for each bit of significance for an 8-bit system, using conventional pulse width modulation, with bit 7 being the most-significant bit, and bit 0 being the least significant bit.

TABLE 1

| Bit | Time Determination | Upper Time Limit (μsecs) |
| --- | --- | --- |
| MSB (bit 7) | <½ color seg. time | 2780 |
| MSB-1 (next MSB, bit 6) | <¼ color seg. time | 1390 |
| bit 5 | <⅛ color seg. time | 695 |

TABLE 1-continued

| Bit | Time Determination | Upper Time Limit (μsecs) |
|---|---|---|
| bit 4 | <1/16 color seg. time | 348 |
| bit 3 | <1/32 color seg. time | 174 |
| bit 2 | <1/64 color seg. time | 87 |
| bit 1 | <1/128 color seg. time | 43 |
| bit 0 | <1/256 color seg. time | 21 |

Therefore, for a modulator that has a minimum time of 40 μsecs, no more than 7 bits of data can be displayed. 21 μsecs does not allow enough time for the element to reset to the new data, receive the next data and reset to that new data. One example of a modulator with such a limitation is shown in FIG. 1.

FIG. 1 shows a side view of a modulating element 10 known as a digital micromirror device (DMD). The mirror element 20, is stable at the flat position, where it is supported by the beam 16. When the mirror is addressed by address electrode 12b, the mirror tilts until one side of it comes to rest on landing electrode 14b and the mirror is in the position 22a. After the time period for that bit of data has elapsed, the mirror is reset, that is, it is given a signal that makes it respond to new data. For this discussion, we will assume that if the data causes the mirror to assume position 22a, as discussed above, the mirror is ON. Light from the mirror reflects to the screen or surface upon which the image forms.

After a reset signal, the new data could be an ON signal, in which case the mirror would return to position 22a, or it could be an OFF signal, in which case the mirror would assume position 22b. Position 22b is attained by addressing address electrode 12a, causing the mirror to come to rest on landing electrode 14a. In the OFF position, it is desirable to have the mirror to assume the opposite position rather than remain flat, as this prevents the hinge from becoming permanently canted towards the ON position and allows for greater separation between the ON and OFF paths of light in the optical system.

However, there is a mirror response time associated with the movements of the mirror. It takes some interval of time, usually around 10 μsecs for the mirror to assume the new position, called the mirror flight time. This response time is what limits the minimum amount of time that must be allowed in the LSB time. Other modulators besides the DMD have similar limitations upon their response time. The Actuated Mirror Device, or AMA, has a similar limitation as to the mirror's movement. Liquid crystal cells must be given time to twist, in order to allow the cell to be ON or OFF.

However, there exists a method and system that allows more bits to be process within a color segment time. The extra bits per sample available to the system help eliminate the artifacts of low intensity contouring, "dirty" dark areas, and helps to better simulate a continuous intensity response.

The limitation on the system is the minimum amount of time available for the LSB to be properly displayed. Therefore, if there were a way to lengthen the LSB time, the limitation would not apply. However, increasing the LSB time will change the picture, if the standard density color wheel segments were used.

Figure 2:
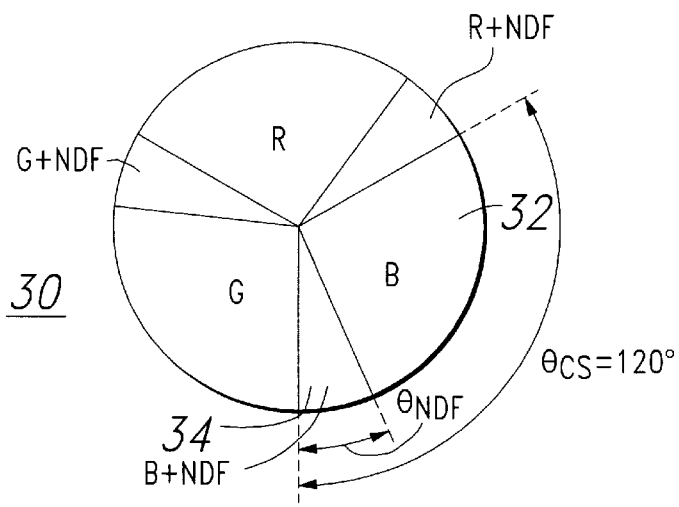
FIG. 2 shows a color wheel with neutral density filters for each color.

By including in the color wheel, lower density color segments within each color segment, the LSB time can be extended, allowing more bits to be used for each data sample. An example of this color wheel is shown in FIG. 2.

The color wheel, 30, has three segments, each with an arc length ($\theta_{CS}$) of 120°. Within each arc length is a neutral density filter of a smaller arc length ($\theta_{NDF}$). For example, segment 32 which is blue, includes a segment of blue plus the neutral density filter, resulting in a lower density blue segment with a length of $\theta_{NDF}$. In order to allow the neutral density region, the timing of the lower significance bits must be increase inversely proportional to the density of the NDF. The higher significance bits will be modulated as with conventional pulse width modulation.

Figure 3:
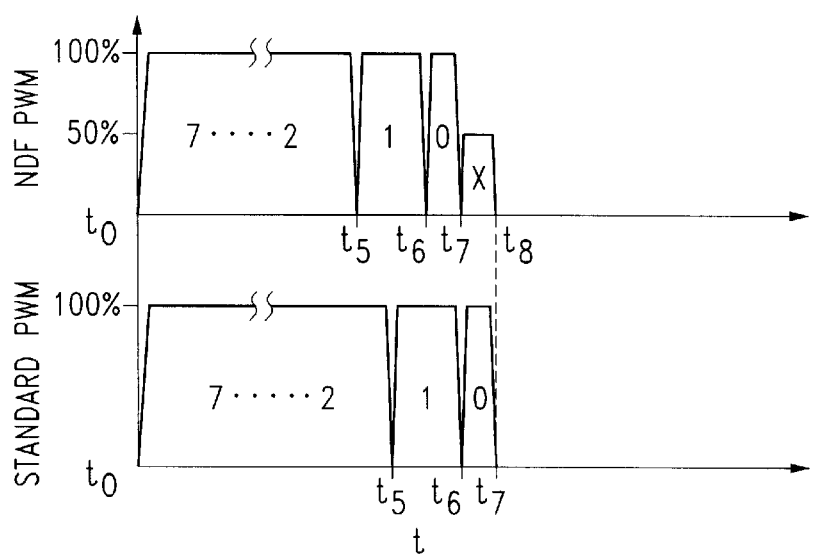
FIG. 3 shows a timing diagram for conventional pulse width modulation compared with an example of pulse width modulation using neutral density filters.

An example of the timing diagram for a neutral density filter modulation is shown in FIG. 3. On the standard PWM diagram, the diagram starts with $t_0$ which is the beginning of the MSB. The MSB is displayed for its conventional time width of approximately 2780 μsecs until $t_1$. The pulse width modulation remains nearly the same between the two diagrams until the end of bit 0 at $t_6$.

In the NDF PWM system, an extra bit is displayed for the width of $t_7$ to $t_8$ which is same length as the bit 0 time, but the intensity of the region is only 50% of the intensity of the main part of the color segment. By halving the intensity, it allows the bit to be displayed for twice as long. The time in the NDF PWM system for the eighth bit is then 43 μsecs long. The use of the extra 43 μsecs must be accommodated from the other bits in the scheme.

The time for these lower significance bits is the ratio of the intensity of the main color segment to the NDF segment multiplied by the conventional PWM time. For example, the time for an eighth bit above would be 43/2 or 21.5 μsecs. The ratio of the main segment of the color to the NDF segment is 2:1 (the NDF segment being ½ the intensity of the main segment). This results in 2 times 21.5 which equals 43 μsecs. As stated above, however, the increase in time by 43 μsecs reduces the amount of time available for the other, conventionally modulated bits.

This may result in an overall drop in the light efficiency of the system, as shown in the below table in the way of example scenarios. The table shows the number of bits of the system, meaning the number of bits per data sample for each pixel. The NDF density is the density of the NDF compared to the density of the main segment of the color, assumed to be 1. For example, an NDF density of 0.5 means that the NDF density is ½ that of the main segment of that color. For systems of a certain number of bits, there may be more than the LSB displayed during the NDF system, shown as "Bits in NDF."

Since the LSB time is the limit on the system, i.e. the system cannot have an LSB below a certain amount of time, that amount of time is usually referred to as the LSB time, and the other bits are multiples of the LSB time. For example, in a 7-bit system, the MSB is 64 times the LSB time. The amount of time used in the NDF segment of the color wheel is also compared in the table.

TABLE 2

| No. of bits | NDF Density | Bits in NDF | NDF % of $\theta_{CS}$ | LSB time (μsecs) | Light efficiency |
|---|---|---|---|---|---|
| 7 | N/A | 0 | N/A | 43 | 0.81287 |
| 8 | 0.5 | 1 (0) | 13.89% | 43 | 0.8093 |
| 9 | 0.237 | 2 (0, 1) | 13.85% | 41.562 | 0.7672 |
| 10 | 0.105 | 3 (0, 1, 2) | 15.97% | 39.023 | 0.7095 |
| 10 | 0.0775 | 3 (0, 1, 2) | 17.48% | 38.364 | 0.6943 |
| 11 | 0.0775 | 4 (0, 1, 2, 3) | 14.13% | 30.282 | 0.6281 |
| 11 | 0.06 | 4 (0, 1, 2, 3) | 15.09% | 36.7066 | 0.6539 |

As can be seen from the table, more bits of data can be obtained for display, but the LSB time and the overall light efficiency decrease in this example. The overall light efficiency reduces the perceived brightness of the image. The LSB time decrease shown in this example may result in a greater load on the data processing and memory functions of the addressing system. However, the use of these tradeoffs lies with the system designer. The system above results in a greater number of bits being made available for imaging within the time constraints of spatial light modulators, enabling the system to project images with reduced artifacts.

The timing used in these examples are simplified for discussion purposes. The times must take into account reset allowance times, extra reset times for split bits, special clear times for short bits on devices that have global resets, and spoke allowance times as well as any other special times necessary for the operation of the modulator Table 1 and the timing diagrams do not take these into account for explanation of the general concepts. However, the times given in Table 2 do account for these times.

The above use of an NDF may also be incorporated into other system architectures. In a monochrome system, that which is referred to above as a color wheel would become a clear wheel in a monochrome system. The NDF region would be some predetermined shade of gray. This would allow more bits to be used in a monochrome system.

Further embodiments include a 2-chip system, where there are two spatial light modulators and two color wheels. One color wheel would have one color, and the second would have two. Each color would have its own NDF region. In a 3-chip system, each spatial light modulator might have its own color wheel with one color and an NDF region. Alternately, the entire system may have one wheel that is clear with a gray NDF region, in which case each modulator would have its own colored source of light.

In these multiple color wheel systems, or in the single wheel system, not every color wheel segment must necessarily have an NDF region. For reasons related to a system's particular color profile, one color may have an NDF region and the others may not, etc. Additionally, even though the mention of filters above has used color wheels, other types of filters could be used. For example, a liquid crystal variable NDF or color controller could be used to control the amplitude modulation.

Thus, although there has been described to this point particular embodiments of a system and method for increasing the number of bits in a display system, it is not intended that such specific references be considered as limitations upon the scope of this invention except in-so-far as set forth in the following claims.

What is claimed is:

1. A video display system, comprising:
   a spatial light modulator, such that said spatial light modulator creates images by deflection of selected ones of an array of individual elements over a period of time, wherein said period is divided into a predetermined number of intervals;
   a light source operable to illuminate said spatial light modulator;
   at least one filter through which light from said source passes before said light impinges upon said spatial light modulator, wherein said filter includes a neutral density region, and wherein said neutral density region has a density proportional to said filter which determines what multiple of said interval is used for data displayed through said neutral density filter.

2. The system of claim 1 wherein said spatial light modulator is a DMD.

3. The system of claim 1 wherein said spatial light modulator is an AMA.

4. The system of claim 1 wherein said spatial light modulator is a liquid crystal device.

5. The system of claim 1 wherein said filter is a liquid crystal controller.

6. The system of claim 5 wherein said liquid crystal controller is operable to control color.

7. The system of claim 5 wherein said liquid crystal controller is operable to control the value of a neutral density filter.

8. The system of claim 1 wherein said system includes 3 spatial light modulators and 1 color wheel.

9. The system of claim 1 wherein said system includes 3 spatial light modulators and 3 color wheels.

10. The system of claim 1 wherein said system includes 2 spatial light modulators and 2 color wheels.

11. A method of pulse width modulation used in creating an image, comprising
    displaying higher significance bits of predetermined number of bits per data with conventional pulse widths;
    displaying lower significance bits of said predetermined number of bits per data sample such that said lower significance bits have a pulse width equal to the conventional pulse width for those bits multiplied by the ratio of filter intensity to a predetermined lower intensity neutral density segment of said filter.

12. The method of claim 11 wherein said displaying lower significance bit step further comprises displaying one said lower significance bit of an 8-bit system.

13. The method of claim 11 wherein said displaying lower significance bit step further comprises displaying two said lower significance bits of a 9-bit system.

14. The method of claim 11 wherein said displaying lower significance bit step further comprises displaying three said lower significance bits of a 10-bit system.

15. The method of claim 11 wherein said displaying lower significance bit step further comprises displaying four said lower significance bits of an 11-bit system.

16. The method of claim 11 wherein said method is applied to a 5-bit system.

17. The method of claim 11 wherein said method is applied to a 6-bit system.

18. The method of claim 11 wherein said method is applied to a 7-bit system.

19. The method of claim 11 wherein said method is applied to a 12-bit system.

20. A filter wheel operable to be used in a video display system, comprising:
    at least one segment of said wheel having a neutral density filter, such that said neutral density filter segment comprises a region of lower intensity of said segment.

* * * * *